United States Patent [19]

Alexander et al.

[11] 4,379,372
[45] Apr. 12, 1983

[54] PLANT TAG

[75] Inventors: Lee J. Alexander, Plano; Harold E. Vanberg; Clyde E. King, both of Dallas, all of Tex.

[73] Assignee: Horticultural Printers/Carscallen Nursery Label Company, Dallas, Tex.

[21] Appl. No.: 328,510

[22] Filed: Dec. 8, 1981

[51] Int. Cl.³ .............................. G09F 3/18; G09F 3/08
[52] U.S. Cl. ...................................... 40/10 C; 40/316; 40/20 R
[58] Field of Search ............. 40/10 C, 360, 2 R, 20 R, 40/21 R

[56] References Cited

U.S. PATENT DOCUMENTS

| 478,185 | 7/1892 | Barnum | 40/10 C |
|---|---|---|---|
| 1,304,417 | 5/1919 | Underwood | 40/20 R |
| 1,382,426 | 6/1921 | Kleebauer | 40/21 R |
| 1,430,641 | 10/1922 | Ginn | 40/20 R |
| 2,669,047 | 2/1954 | Rieger | 40/2 R |

FOREIGN PATENT DOCUMENTS 704530 12/1979 U.S.S.R. .............................. 40/10 C

Primary Examiner—Gene Mancene
Assistant Examiner—Michael J. Foycik, Jr.
Attorney, Agent, or Firm—Richards, Harris & Medlock

[57] ABSTRACT

A plant tag is provided for placement on a plant. The plant tag has a resilient tag portion with first and second holes formed therethrough. Guide notches are provided at exposed edges of the tag portion on either side of a scored line. Cuts extend from each of the first and second holes to a guide surface on the same side of the scored line. The tag is foldable about the scored line to align the first and second holes. The guide surfaces guide the tag onto the plant with the edges of the cuts being separated to permit the plant to pass through and into the first and second holes. The resilient tag unfolds to lock the tag on the plant and the cuts are nonaligned to form tabs to lock the tag to the plant by resisting simultaneous separation of the edges of the cuts.

15 Claims, 8 Drawing Figures

U.S. Patent  Apr. 12, 1983  4,379,372 ial.
PLANT TAG

TECHNICAL FIELD

This invention relates to the nursery industry, and in particular to the application of identifying plant material.

BACKGROUND ART

It is common to apply tags to plants prior to their sale. The purpose of the tags may be for plant identification, to describe plant care requirements or any other desired information. Many tags are applied at a wholesale nursery or grower prior to shipment to a retailer. Still other tags are placed on the plants by the retailer prior to sale to a consumer.

The tags employed must be weather resistent. For this reason, the majority are formed of vinyl plastic, styrene plastic or other suitable plastic form. A basic tag design is one with a simple hole punched in it which is attached to the plant through the hole by a wire or clip. Other tags have nonlinear cuts or slots formed into the tag opening into a hole. A stem or other rigid part of the plant is then guided through the slot into the hole. The tags secured to the plants by a wire or clip suffer the disadvantage of requiring the person applying the tag to expend relatively substantial effort to place the tag on the plant. The other tags noted are much simpler to apply and reduce the labor necessary. However, they often fall off of the plant.

One tag was developed which included an area for applying information and a flap. The flap is folded over to double thickness and glued. Aligned holes are formed through the double layer of the flap and nonlinear cuts are formed extending from the folded edge of the flap to the holes. The stem or branch of the plant is slid between the slots and into the holes. The slots in each layer are not aligned so that overlapping portions of the flaps form a self-locking feature. While this tag has several advantages over the prior tags, the labor and cost in gluing the flap greatly reduces the attractiveness of the design.

Therefore, a need has been shown for a tag which reduces manufacturing costs and reduces the labor necessary to apply the tag. Yet, the tag must be one that provides a sure locking mechanism that will remain on the plant under reasonable conditions. Finally, the tag is preferably positioned on the plant for ready observation by the potential purchaser.

SUMMARY OF THE INVENTION

In accordance with one aspect of the present invention, a plant tag is provided for use on a plant. The tag includes a resilient portion having first and second nonoverlapping holes formed therethrough. Nonlinear cuts extend from the edge of each of the holes. The resilient portion is foldable along a predetermined line to bring the holes in alignment for placing the tag on the plant through the cuts and into the holes. The resilient portion unfolds to lock the tag on the plants with the cuts overlapping to resist removal of the tag. The resilient portion retains the tag in a fixed position on the plant for facilitating observation.

In accordance with another aspect of the present invention, a plant tag for use on a plant is provided. The plant tag includes a resilient portion having a score line across its surface with first and second nonoverlapping holes formed therethrough on either side of the score line. A third hole is formed through a portion of the score line. Nonlinear cuts are made through the resilient portion which interconnect the first to third hole and the second to third hole. The resilient portion is foldable about the score line to form a guide with the edges of the third hole to guide placement of the tag on the plant. The tag permits movement of the plant through the cuts and into the first and second holes. The resilient portion resiliently unfolds to lock the tag on the plant with the cuts overlapping to resist removal of the tag.

In accordance with yet another aspect of the present invention, a method of manufacturing a plant tag for placement on a plant is provided. The method includes the steps of forming first and second nonoverlapping holes through a resilient portion and scoring a line between the first and second holes on the tag for folding the resilient portions to align the holes. The method further includes the steps of forming at least one guide for placing the tag on the plant by cutting a notch into the tag opening to receive the plant when folded and forming nonlinear cuts through the resilient portion between each of the first and second holes and the guide for permitting the tag to be placed on the plant through the cuts and into the first and second holes whereby the resilient portion unfolds to lock the tag on the plant and the cuts overlap to resist removal of the tag.

BRIEF DESCRIPTION OF DRAWINGS

A more complete understanding of the invention and its advantages will be apparent from the foregoing Detailed Description when taken in conjunction with the accompanying Drawings in which.

DETAILED DESCRIPTION

Figure 1:
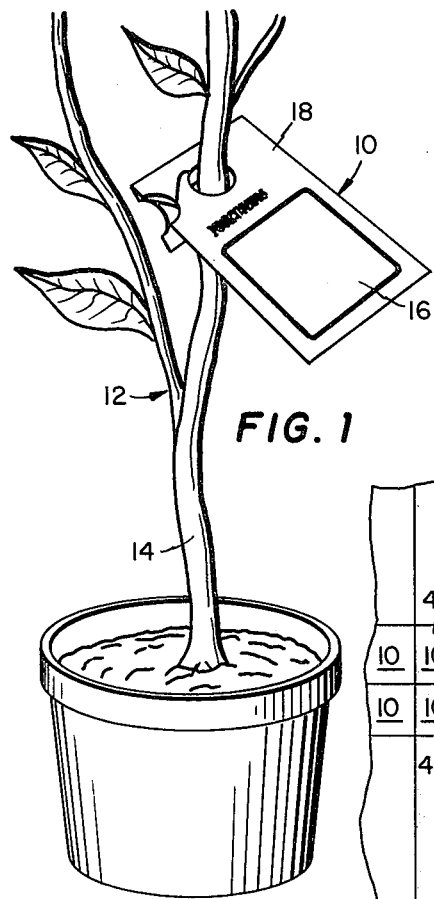
FIG. 1 is a perspective view of a first embodiment of the present invention positioned on the stem of a plant.

Referring now to the drawings, wherein like reference numerals designate like or corresponding parts through several views, there is shown a tag 10 forming a first embodiment of the present invention adapted for placement on a plant 12 having a stem or branch 14.

The tag 10 is separated into two major portions. The information portion 16 relates the desired information, such as the identification of the plant, appearance of the plant, instructions for care or other information. A resilient tag portion 18 serves to mount the tag on the plant. In the preferred embodiment, the entire tag 10 is formed of a resilient material such as vinyl or styrene plastic, cardboard or other suitable material. However, it is possible to construct the portion 18 of a flexible material with portion 16 being formed of any desired material with the portions being secured together to form the tag.

Figure 2:
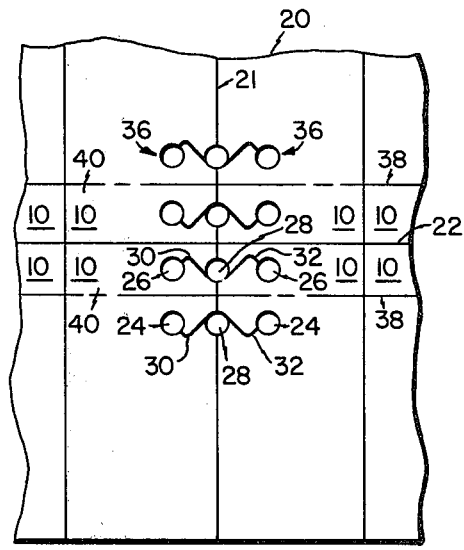
FIG. 2 illustrates a plan view of the first embodiment prior to folding.

The tag 10 is suitable for mass production as illustrated in FIG. 2. A sheet 20 of flexible material is provided. The individual rectangular tags 10 are cut from the sheet 20 as shown along the lines 21 and 22. First holes 24 and second holes 26 are formed through each of the tags 10 proximate one end thereof. The holes 24 and 26 are located completely within the outer boundary of the tag. Third holes 28 are formed between adjoining tags with two semicircular edges 29 so that semicircle halves are provided in each of the tags. Nonlinear cuts 30 are made between the edges of each of the first holes and third holes and nonlinear cuts 32 are provided between the edges of each of the second and third holes. Each of the first and second holes and edge 29 of the third hole to which the first or second hole is interconnected by cuts define a single locking group 36.

A score line 38 is formed on one face of the tags extending from edge to edge between each of the locking groups in a single tag. Finally, the individual tags are cut from the sheet for further processing. The information is printed on the tags prior to the cutting. The tags 10 are flat as shown in FIG. 2 and may be stacked, stored or shipped in this condition.

When tag 10 is to be applied to plant 12, the flap 40 containing one locking group is folded along the score 38 to form a double layer thickness with the score line 38 forming the edge of the tag. The fold is preferably made so that some resilient springback of the flap to the flat condition remains.

Figure 3:
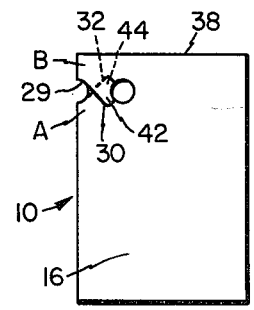
FIG. 3 illustrates a plan view of the first embodiment after folding and ready for placement on a plant.

The semicircles 29 of the third hole 28 in the tag are aligned when the flap is folded and act as guides as the tag is applied to the plant to center the branch or stem 14 within the semicircles 29 for passage through the cuts 30 and 32. The tag 10 may then be held at spots on opposite sides of the cuts 30 and 32, such as points A and B shown in FIG. 3. The edges of the cuts are then moved in opposite directions to open a gap sufficient to permit the branch or stem 14 of the plant 12 to slide into the first and second holes 24 and 26. It is evident from FIG. 3 that sufficient force must be applied to overcome the self-locking feature of the overlapping tabs 42 and 44 resulting from the curvalinear and nonaligned nature of the cuts 30 and 32.

When the tag 10 has been placed on the plant, the edges of the cuts 30 and 32 are then brought into alignment to lock the tag on the plant. The resilient nature of the portion 18 attempts to unfold the flap 40 from close proximity to the remainder of the tag, locking the tag on the plant as shown in FIG. 1. This locking feature also fixes the tag 10 in the position on the plant in which it was placed. If the tag is positioned initially to provide the most effective observation of the information on portion 16, the tag will retain this position until removed.

The tag 10 therefore has many advantages over prior known tags. The tags may be manufactured with the minimum of waste of the material in sheet 20. The tag includes the locking feature provided by the tabs 42 and 44 and is locked on the plant by the resilient nature of the tag. The third hole 28 provides a guide for guiding the tag on the plant.

If desired, the score line 38 may be deleted during the manufacture of the tag and the flap folded manually. In addition, the provision of two holes 24 and 26 and two cuts 30 and 32 provide two independent locks to lock the tag on the plant. Should the plant slide from the first hole through the cut 30, the hole 26 will retain the tag on the plant. This provides an advantage over the previous glued flap tag. Even if one lock were broken on the tag 10, the second lock would remain to hold the tag on the plant.

Figure 4:
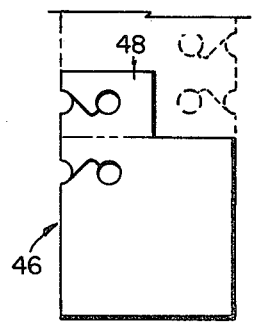
FIG. 4 illustrates a plan view of a first modification of the tag forming the first embodiment.

A first modification of tag 10 is illustrated in FIG. 4 as tag 46. The structure of tag 46 is identical to tag 10 in many details. The identical structure is identified by the same reference numerals applied to tag 10. However, the flap 48 of tag 46 extends only part way across the width of the tag. This permits more tags having the same area of information portion 16 to be produced from the same area sheet 20. This results from the use of the reduced width flap. The material formally in the flap of the lower tag can be retained by the tag immediately above it in the sheet to form its flap.

Figure 5:
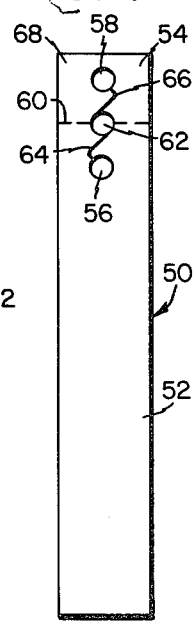
FIG. 5 illustrates a plan view of a second embodiment of the present invention.

A second embodiment of the present invention is illustrated in FIG. 5 as tag 50. Tag 50 has a shape suitable for use as a strip tag with information printed on the information portion 52. The resilient tag portion 54 includes first hole 56 and second hole 58. A score line 60 is formed between the two holes across the width of the tag. A third hole 62 is formed through the tag portion 54 over a portion of the score line 60.

A nonlinear cut 64 is formed through the portion from the edge of the first hole to the edge of the third hole. A nonlinear cut 66 is formed between the edges of the second hole and the third hole. When the flap 68 defined on one side of the score line 60 is folded to align the first and second holes, the tag 50 may be positioned and locked on the plant in a manner substantially identical to the tag 10 discussed previously.

Figure 6:
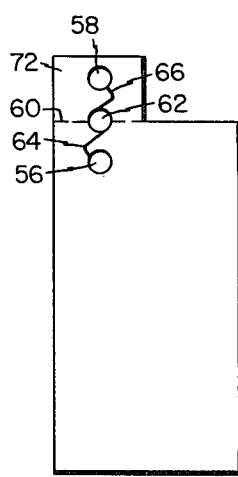
FIG. 6 illustrates a plan view of a first modification of the second embodiment.

The tag 70 illustrated in FIG. 6 illustrates a first modification of the tag 50. The tag 70 has substantial similarities with the tag 50 and similar features are idenified by the identical reference numbers on tag 50. The tag 70 is shaped to form a picture tag for illustrating the ideal appearance of the plant. The flap 72 extends only part way across the width of the tag which permits the most efficient production from a single sheet 20 with the material which would go into the flap 72 if it extended the entire width of the tag being employed for the flap on another tag as was possible with the tag 46 illustrated in FIG. 4.

Figure 7:
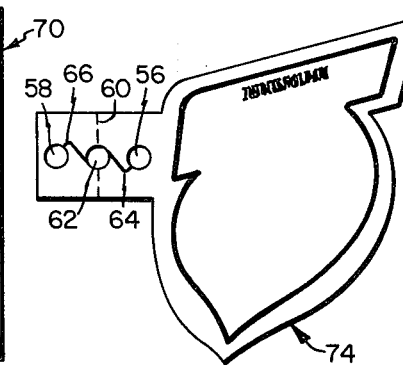
FIG. 7 illustrates a plan view of a second modification of the second embodiment.
Figure 8:
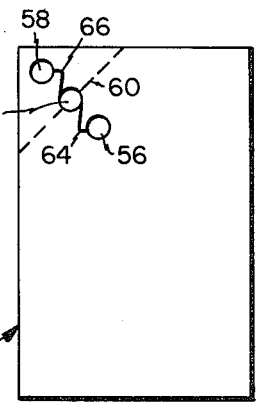
FIG. 8 illustrates a plan view of a third modification of the second embodiment of the present invention.

Tag 74 illustrated in FIG. 7 illustrates a second modification of the tag 50 which may also operate as a picture tag or be used for a novel display design cooperating with the shape of the tag. Tag 76 illustrated in FIG. 8 illustrates a third modification of the tag 50 with the tag portion at one corner of the tag.

It can be readily seen that the tags forming the second embodiment of the present invention described hereinabove and illustrated in the drawings possess significant advantages over prior known and used tags. The tags are readily manufactured with simple shapes and make efficient use of the material from which the tags are formed. The tags are readily placed on a plant and the resilient flap locks the tag on the plant extending for ready observation. The provisions of separate and aligned holes provides a double lock to retain the tag on the plant should one lock be defeated.

While several embodiments of the present invention have been described in detail herein and shown in the accompanying drawings, it will be evident that various further modifications or substitutions of parts and elements are possible without departing from the scope of the invention.

We claim:

1. A plant tag for use on a plant comprising:

a resilient portion having first and second nonoverlapping holes formed therethrough with nonlinear cuts extending from the edge of each of the holes, the resilient portion being foldable along a predetermined line between the first and second holes to align the holes, the cuts extending from each of the holes to an edge of the resilient portion, the resilient portion permitting placement of the tag on the plant by separating the edges of the cuts for passage of the plant into the first and second holes, the resilient portion resiliently unfolding after placement on the plant until the portion of the edge of each of said first and second holes adjacent to the predetermined line contacts one side of the plant and the portion of the edge of each of said first and second holes distal the predetermined line contacts the opposite side of the plant to lock the tag on the plant and maintaining the tag in a fixed position on the plant for facilitating observation, the cuts being nonaligned to lock the tag on the plant.

2. The plant tag of claim 1 wherein the resilient portion further includes a guide notch formed in an edge of the resilient portion on each side of the fold, the nonlinear cuts extending from the edge of each of the holes to one of the guide notches, the guide notches acting to guide the tag onto the plant.

3. The plant tag of claim 1 wherein the resilient portion is scored along the fold line to assist the fold.

4. The plant tag of claim 2 wherein said guide notch is formed by a third hole through the resilient portion over a portion of the fold to define the guide notches after folding.

5. A plant tag for use on a plant comprising:
a display portion having information displayed thereon; and
a resilient portion secured to the display portion having a score line across its surface with first and second holes being formed on opposite sides of the score line, guide surfaces being formed at an exposed edge of the resilient portion on both sides of the score line when folded about the score line to align the first and second holes, cuts being made between the first hole and guide surface on one side of the score line and between the second hole and guide surface on the other side of the score line, the guide surfaces guiding the tag on the plant so that the separation of the edges of the cuts permits the plant to move through the cuts and into the first and second holes with the display portion in a position for facilitating observation of the information displayed thereon, the resilient portion resiliently unfolding after placement on the plant until the portion of the edge of each of said first and second holes adjacent the score line contacts one side of the plant and the portion of the edge of each of said first and second holes distal the score line contacts the opposite side of the plant to lock the tag on the plant and maintaining the tag fixed in the position on the plant for facilitating observation, the cuts being nonaligned to overlap sections of the resilient portion on either side of the scored lines to resist separation of the edges of the cuts.

6. The plant tag of claim 5 wherein said guide surfaces are formed by a third hole formed through the resilient portion over a portion of the score line so that upon folding, guide surfaces are formed on the exposed edge of the resilient portion on either side of the score line.

7. A plant tag for use on a plant comprising:
a display portion having information displayed thereon; and
a resilient portion secured to the display portion having first and second circular holes formed therethrough for receiving a portion of the plant, a score line being formed in the surface of the resilient portion between the first and second holes to permit folding of the resilient portion about the score line to align the first and second holes, a semicircular guide notch being formed on an exposed edge of the resilient portion on each side of the scored line with a cut interconnecting each of the guide notches with the holes positioned on the same side of the score line, the guide notches guiding the tag onto the plant, the tag permitting separation of the cuts between the guide notches and first and second holes to pass a portion of the plant through the cuts and into the holes with the display portion in a position for facilitating observation of the information displayed thereon, the resilient portion resiliently unfolding after placement on the plant until the portion of the edge of each of said first and second holes adjacent the score line contacts one side of the plant and the portion of the edge of each of said first and second holes distal the score line contacts the opposite side of the plant to lock the tag on the plant and maintaining the tag fixed in the position on the plant for facilitating observation, the cuts being nonaligned to form tabs to resist simultaneous separation of the edges of the cuts.

8. A plant tag for use on a plant comprising:
a display portion having information displayed thereon; and
a resilient portion secured to the display portion having a score line across its surface for permitting a fold along the score line, first and second circular holes being formed through the resilient portion on either side of the score line, a third circular hole being formed through the resilient portion between the first and second holes and centered on the score line, cuts being made between the edges of the first hole and third hole and between the edges of the second hole and third hole, the semicircular portions of the third hole on opposite sides of the score line forming guide surfaces when the resilient portion is folded along the score line to guide the tag onto a plant, the edges of the cuts being separable to permit passage of a portion of the plant therebetween into the first and second holes with the display portion in a position for facilitating observation of the information displayed thereon, the resilient portion resiliently unfolding after placement on the plant until the portion of the edge of each of said first and second holes adjacent the score line contacts one side of the plant and the portion of the edge of each of said first and second folds distal the score line contacts the opposite side of the plant to lock the tag onto the plant with the tag maintained fixed in the position for ready observation, the cuts being nonaligned after folding to define tabs on the resilient portion on either side of the score line to resist simultaneous separation of the edges of the cuts to resist removal of the tag.

9. A method of manufacturing a plant tag for placement on a plant comprising the steps of:
forming first and second nonoverlapping holes through a resilient portion of the tag; and forming cuts extending from the edge of each of the holes to an exposed edge of the plant tag when the resilient portion is folded about a predetermined line between the first and second holes to permit the edges of the cuts to be separated for passing a portion of a plant therethrough into the first and second holes so that the resilient portion expands after placement on the plant until the portion of the edge of each of said first and second holes adjacent the predetermined line contacts one side of the plant and the portion of the edge of each of said first and second holes distal from the predetermined line contacts the opposite side of the plant to lock the tag on the plant and maintain the tag in a fixed position for ready observation.

10. The method of claim 9 further comprising the step of forming at least one guide surface at the exposed edge of the resilient portion when folded along the predetermined line, the cuts extending to the guide surface from the hole on the same side of the predetermined line, the guide surfaces guiding the tag onto the plant.

11. The method of claim 9 further comprising the step of scoring the resilient portion along the predetermined line to facilitate the folding thereof.

12. The method of claim 10 wherein the step of forming a guide surface on each side of the predetermined line includes the step of forming a third hole through the resilient portion over a portion of the predetermined line so that when folded about the predetermined line, edges of the third hole form the guide surfaces on each side of the predetermined line.

13. The method of claim 9 wherein the plant tag is manufactured from a sheet of a resilient material and the method further includes the step of cutting plant tags from the sheet to minimize the waste material formed after cutting.

14. A method of manufacturing plant tags from a sheet of a resilient material for placement on a plant comprising the steps of:
forming first and second nonoverlapping holes through each of the plant tags;
scoring a line between the first and second holes on each of the tags for folding the tags about the score line to align the first and second holes and forming a guide surface at an exposed edge of the tag on each side of the score line when the tag is folded;
forming cuts extending from the guide surface to the hole on the same side of the score line; and
cutting the plant tags from the sheet, the guide surfaces on each tag for guiding the tag onto the plant and the edges of the cuts being separable to permit a portion of the plant to move into the first and second holes with the tag resiliently unfolding until the portion of the edge of each of said first and second holes adjacent the score line contacts one side of the plant and the portion of the edge of each of said first and second holes distal from the score line contacts the opposite side of the plant to lock the tag onto the plant with the tag in a fixed position for ready observation, the cuts in each plant tag being nonaligned to define tabs to resist simultaneous separation of the edges of each of the cuts on the plant tag.

15. The method of claim 14 wherein the step of forming guide surfaces on each side of the score line in the plant tag includes the step of forming a third hole through the plant tag over a portion of the score line so that the edges of the third hole on either side of the score line defines the guide surfaces.

* * * * *